United States Patent Office 2,797,830
Patented July 2, 1957

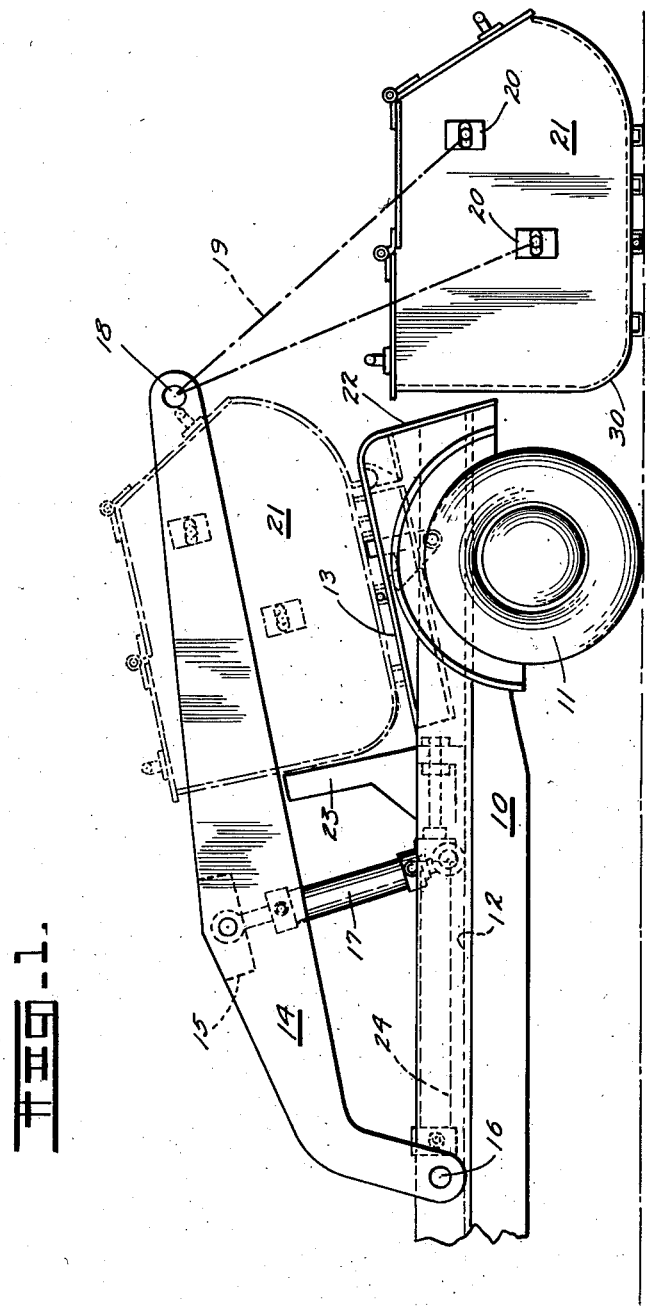

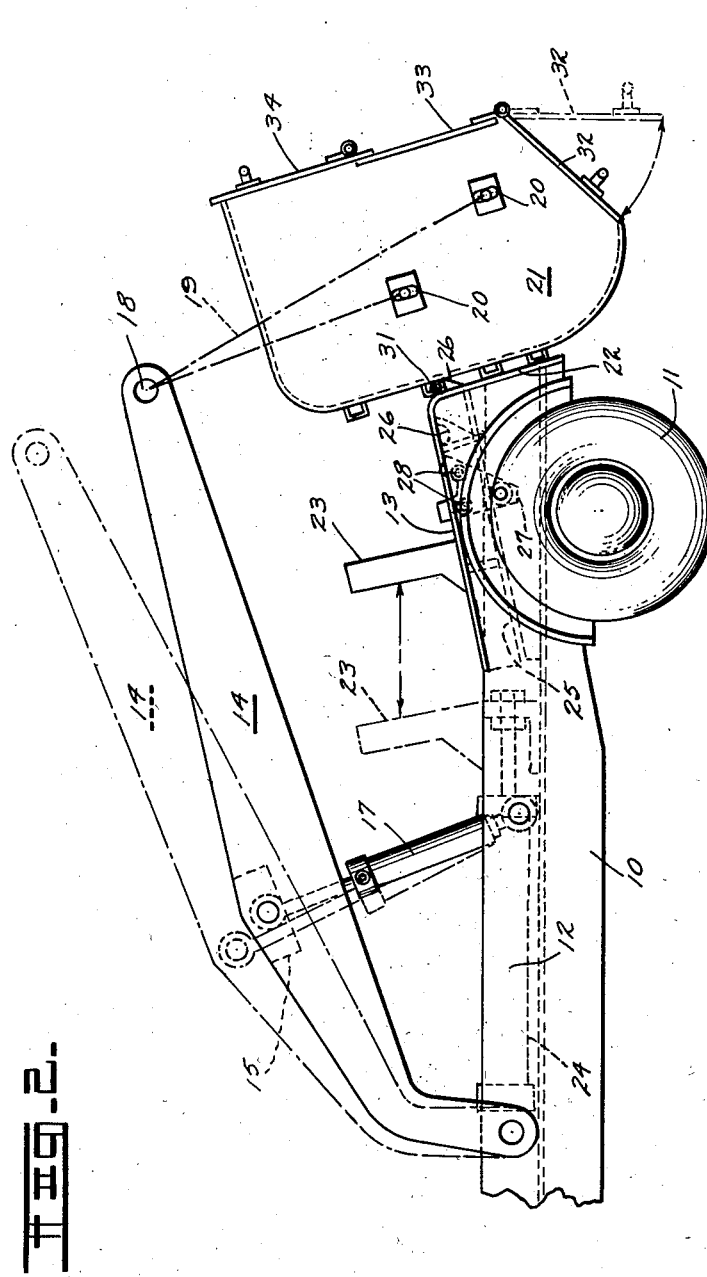

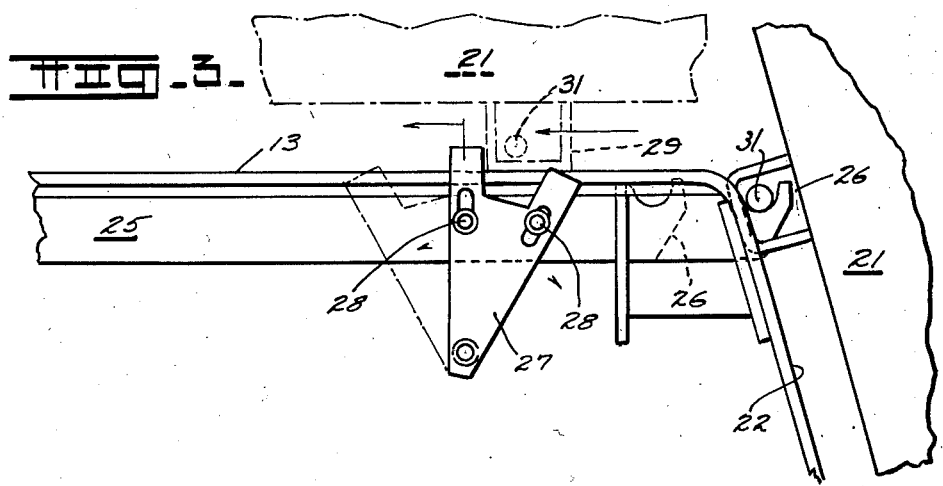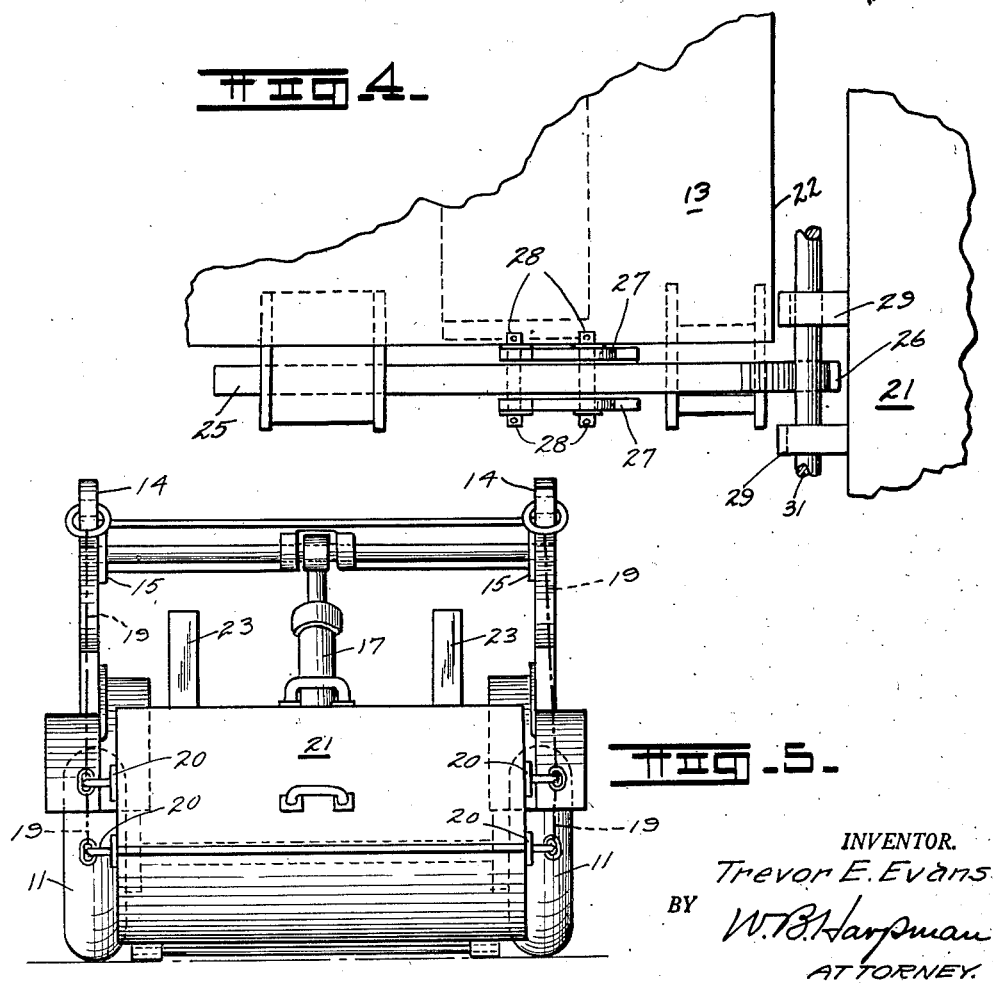

2,797,830

LOADING, HAULING, AND DUMPING APPARATUS

Trevor E. Evans, Youngstown, Ohio

Application February 24, 1953, Serial No. 338,484

4 Claims. (Cl. 214—317)

This invention relates to improvements in loading, hauling and dumping apparatus.

The principal object of the invention is the provision of an improved apparatus for the handling of waste materials such as rubbish and the like wherein a single vehicle with a hoist mechanism is employed to economically and efficiently load, transport and dump containers loaded with the indicated material.

A further object of the invention is the provision of an improved loading, transporting and dumping apparatus including a container employed therewith which is of strong and efficient construction and adapted to be economically manufactured and operated.

A still further object of the invention is the provision of an improved loading, transporting and dumping apparatus which can be installed on a truck chassis and used in connection with suitable containers and operated by a single person.

A still further object of the invention is the provision of an improved loading, transporting and dumping apparatus which may be positioned on and attached to a truck chassis and operated without straining the truck chassis or requiring additional support therefor.

A still further object of the invention is the provision of a loading, transporting and dumping apparatus in which novel means is employed for holding a container in dumping position and which means is operated by the relative position of said container.

A still further object of the invention is the provision of an improved loading, transporting and dumping apparatus in which means is employed for moving a container rearwardly of the apparatus to a point where the container of the apparatus will pivot on its transverse axis and automatically move to dumping position while still attached to the said apparatus.

The loading, hauling and dumping apparatus disclosed herein comprises an improvement in the art relating to such apparatus and particularly in the formation of the apparatus and container which enables it to be operated with less strain on the equipment itself and the truck chassis by which it is carried than has heretofore been believed possible.

Additionally, a simple and efficient mechanism is employed which acts to move the container through two parts of the equipment thereby enabling the complete and accurate control of the container at all times.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of a portion of a truck chassis showing the loading, hauling and dumping apparatus with a container adjacent thereto, and in dotted lines the container is shown in position for transporting.

Figure 2 is a side elevation of a portion of a truck chassis showing in solid lines the apparatus and container in dumping position and portions of the apparatus in dotted lines in elevated position.

Figure 3 is an enlarged detail of a portion of the apparatus shown in Figure 2.

Figure 4 is a top plan view of the apparatus shown in Figure 3.

Figure 5 is an end view of the apparatus and container shown in Figure 1.

By referring to the drawings and Figures 1 and 2 in particular it will be seen that a portion of a truck chassis 10 is illustrated including the rear wheels 11 and carrying a frame 12 thereon. The rear portion of the frame 12 is formed in angular relation to the remainder thereof and comprising a platform 13. A boom 14 comprising a pair of arms secured to one another in spaced relation by transverse interconnecting frame members 15 are pivotally mounted on the frame 12 at points 16 and adapted to be raised and lowered by a pair of hydraulic piston and cylinder assemblies 17—17.

The outermost end of each of the arms of the boom 14 are provided with openings 18 by means of which cables or chains 19 may be attached and which cables or chains 19 are also adapted to be attached to lifting lugs 20—20 on the opposite outer sides of a container 21. In Figure 1 of the drawings the solid lines show the container 21 positioned on the ground immediately adjacent the rear portion of the apparatus and in close relation to an angular skid frame 22 forming in effect a downwardly extending portion of the platform 13, heretofore referred to.

The platform 13 and skid frame 22 are formed of heavy structural members capable of holding the container 21 during its upward movement along with the skid frame portion 22 thereof and supporting it when positioned on the platform 13 thereof.

An upright angular frame 23 is mounted on the frame 12 for longitudinal movement therealong and the platform 13 is cutaway to permit the frame 23 to move from the position shown in solid lines in Figure 1 to the position shown in solid lines in Figure 2.

Means for moving the frame 23 is provided and comprises a horizontally positioned hydraulic piston and cylinder assembly 24 which is positioned in the frame 12 and between longitudinally extending portions thereof.

The platform 13 is provided with a longitudinally extending opening continuing, in effect, the areaway in which the frame 23 is movably positioned and a sliding bar 25 is positioned therein which includes a hook 26 on its rearmost end which is normally positioned within the area of the platform 13 and the skid frame 22.

A pair of V-shaped levers 27 are pivoted to the frame 12 adjacent the sliding bar 25 and each of the arms of the V-shaped levers 27 are slotted and pivotally engaged on pivot pins 28 which are secured to the sliding bar 25, as best shown in Figures 3 and 4 of the drawings.

By referring to Figures 3 and 4 of the drawings it will be observed that when the sliding bar 25 is in rearmost position, the hook portion 26 extends beyond the surface of the frame 22 and the V-shaped levers 27 are tilted rearwardly, as shown in solid lines in Figures 3 and 4.

The sliding bar 25 is moved to such position with the hook 26 in exposed position by the action of the container 21 sliding rearwardly along the platform 13, that is from left to right as shown in Figures 3 and 4, the container 21 being supported above the sliding bar 25 by a plurality of transversely and longitudinally spaced transverse cleats 29 on the bottom of the container 21. A pivot bar 31 is positioned transversely of the bottom of the container 21, through several of the cleats 29 and acts to engage the upper ends of the arms of the V-shaped levers 27 and move them together with the sliding bar 25 in the same direction that the container 21 is moved. Conversely, when the container 21 is moved forwardly of the platform 13, that is from right to left, as shown in Figures 3 and 4 of the drawings, the hook 26 is moved to retracted position within the area of the platform 13 and skid frame 22 as shown in dotted lines in Figures 3.

It will thus be seen that the mechanism of the loading, hauling and dumping apparatus is relatively simple and capable of being economically formed and easily operated.

*Operation*

In operating the device, reference is had to Figure 1 of the drawings wherein the container 21 is shown in position on the ground adjacent the rear portion of the apparatus. The boom 14 is lowered by actuation of the hydraulic piston and cylinder assembly 17 and the chains or cables 19 are attached to the lugs 20—20 on the opposite outer sides of the container 21. The boom 14 is then elevated at which time the container will slide upwardly along the angularly disposed skid frame 22 until the lower rounded rear corner 30 of the container 21 slides around the radius joining the substantially horizontal platform 13 with the substantially vertical skid frame 22. It will be observed that the hook 26 is preferably in retracted position or if in accidentally exposed position it will automatically be moved to retracted position by the sliding action of the container 21.

At no time is the container 21 lifted to a height higher than that enabling its lower surface to slide over the radius uniting the platform 13 with the skid frame 22.

The length of the cables or chains 19 and the continuing upward movement of the boom 14 causes the container 21 to slide inwardly of the apparatus or forwardly of the truck and this action may be facilitated, if necessary, by the longitudinal movement of the frame 23, heretofore referred to, which may be engaged with the container 21 so as to move the same forwardly along the platform 13 if necessary.

When the container is moved into transporting position, as shown in dotted lines in Figure 1 of the drawings, the boom 14 is lowered to the position illustrated and the apparatus is ready for transporting action. Upon reaching a disposal site, the boom 14 is again slightly elevated and the frame 23 moved rearwardly causing the container to slide rearwardly on the platform 13 until the center of balance is reached.

It will be observed that such rearward movement of the container by the frame 23 automatically actuates the sliding bar 25 and moves the hook 26 into exposed relation where it catches and pivotally engages the pivot bar 31 on the container 21. The further lowering of the boom 14 permits the container to move into tilted dumping position, as shown in solid lines in Figure 2 wherein the angularly positioned lid 32 thereof automatically opens and permits the contents to emerge therefrom.

In this connection it will be seen that the lid 32 is hinged to a top portion 33 which also carries a secondary hinged lid 34. Alternately, the lids and top portions 32, 33 and 34 may be entirely removable from the container 21 if desired.

At such time as the contents of the container 21 are dumped, the upward movement of the boom 14 moves the container back over center point and forwardly along the platform 13, the frame 23 being returned to its normal retracted position, as shown in dotted lines in Figure 2 of the drawings. Such action automatically retracts the hook 26 when the container moves over the V-shaped levers 27. The container is then transported to its normal station, the boom 14 elevated to lift the container slightly above the platform 13 while the frame 23 moves rearwardly to move the container 21 outwardly and off the apparatus over the hook 26 until the radius 30 of the container slides down the skid frame 22 to the ground where it is positioned and serves as a convenient receptacle for waste materials until such time as it is again picked up by the apparatus, as disclosed.

It will thus be seen that the several objects of the invention are met by the apparatus for loading, hauling and dumping materials as herein set forth. It will occur to those skilled in the art that the ease and simplicity of operation is accomplished by the combination of the dual means for handling the container; that is, the boom 14 by which it is primarily lifted and moved forwardly and rearwardly of the remainder of the apparatus and secondarily by the frame 23 which is movable longitudinally of the apparatus and acts to insure the positioning of the container on the platform 13 and to move the container to tilting position.

Having thus described my invention, what I claim is:

1. Apparatus for loading, transporting and dumping materials, said apparatus comprising a truck, container and a container handling means on said truck including a boom pivoted to said truck and a substantially vertical frame movable longitudinally of said truck, and inclined supporting platform on said truck and an outwardly and downwardly positioned skid frame forming an extension of said supporting platform, and end portion of said boom being movable from a position outwardly of said skid frame to a position over said platform and said vertical frame being movable from the innermost end of said platform to a position inwardly from said outermost end to cause a container positioned thereon to move outwardly on said platform to tilting position over said skid frame and a longitudinally slidable hook in said platform for engaging said container when the same is moved outwardly on said supporting platform, and means on said container for engaging and actuating said slidable hook.

2. The apparatus set forth in claim 1 and wherein the means on the container for actuating the hook comprises a transversely positioned bar spaced with respect to the bottom of said container.

3. In apparatus for loading, transporting and dumping material and comprising a truck, a container and container handling means on said truck including an angularly positioned supporting platform and a depending angularly positioned skid frame, said means comprising a hoist mechanism for elevating said container upwardly along said skid frame and forwardly on said supporting platform and secondary means for moving said container along said supporting platform to a point of balance thereon whereby said container may be tilted to dumping position; an automatically actuated longitudinally slidable hook in said supporting platform for engaging said container when said hook is moved to projecting position with respect to said platform and means on said container for engaging and moving said hook, said means on said container for engaging and moving said hook pivoting said container on said hook when said hook is in projected position.

4. The apparatus set forth in claim 3 and wherein the means on said retractable hook for engaging said container comprises a V-shaped bracket pivoted to said platform and movable in an arc longitudinally of said platform, portions of said V-shaped bracket extending above said platform and movably attached to said hook for moving said hook forwardly and backwardly on said platform when engaged by said container.

References Cited in the file of this patent

UNITED STATES PATENTS

| | | |
|---|---|---|
| 2,069,697 | Dempster | Feb. 2, 1937 |
| 2,281,183 | Dempster | Apr. 28, 1942 |
| 2,354,337 | Smith | July 25, 1944 |
| 2,387,500 | Dempster | Oct. 23, 1945 |
| 2,633,259 | Dempster | Mar. 31, 1953 |